United States Patent [19]

Shimizu et al.

[11] Patent Number: 4,938,062

[45] Date of Patent: Jul. 3, 1990

[54] BAROMETRIC METER

[75] Inventors: Shuhei Shimizu, Kokubunji; Shotaro Nakabayashi, Kukizaki; Masahiko Ohgushi, Tokorozawa, all of Japan

[73] Assignees: Mimy Electronics Co., Ltd., Tokyo; Sanoh Instrument Co., Ltd., Tsukuba; both of Japan

[21] Appl. No.: 255,949

[22] Filed: Oct. 11, 1988

[30] Foreign Application Priority Data

Oct. 12, 1987 [JP] Japan ................. 62-256508

[51] Int. Cl.$^5$ ............................................. G01L 7/06
[52] U.S. Cl. ........................................ 73/386; 73/384; 73/705; 250/231.19
[58] Field of Search ............... 73/386, 384, 387, 705, 73/729; 250/231 P

[56] References Cited

U.S. PATENT DOCUMENTS

| | | | |
|---|---|---|---|
| 3,308,303 | 3/1967 | Weichselbaum et al. | 250/231 P |
| 3,590,259 | 6/1971 | Johnston | 250/231 P |
| 3,612,881 | 10/1971 | King | 250/231 P |
| 3,916,185 | 10/1975 | Jehly | 73/386 |
| 4,086,488 | 4/1978 | Hill | 250/231 P |
| 4,109,147 | 8/1978 | Heske | 250/231 P |
| 4,364,271 | 12/1982 | Froome | 73/384 |
| 4,403,512 | 9/1983 | Nakahama | 73/387 |
| 4,665,747 | 5/1987 | Muscatell | 250/231 P |

Primary Examiner—Joseph A. Orsino
Assistant Examiner—Brent A. Swarthout
Attorney, Agent, or Firm—Emmanuel J. Lobato; Robert E. Burns

[57] ABSTRACT

A barometric meter such as barometer or a barometric altimeter comprises a vacuum chamber having a movable portion which displaces in proportion to air pressure. An aperture plate for allowing a light beam to pass therethrough is mounted to the movable portion of the vacuum chamber, and a light source stationary relative to the vacuum chamber is provided for illuminating the aperture plate. A photoelectric position detector disposed on the other side of the light source relative to the aperture plate and stationary to the vacuum chamber is provided for receiving the light beam which passes through the aperture in the aperture plate and for supplying an output indicative of the positional change of the light beam impinging on the photo-electric position detector. The output of the detector may be digitally displayed on a display as either air pressure or altitude.

2 Claims, 3 Drawing Sheets

BAROMETRIC METER

BACKGROUND OF THE INVENTION

This invention relates to a barometric meter, and more particularly a barometer or a barometric altimeter in which a displacement of a vacuum chamber is detected and displayed as a change in atmospheric air pressure or barometric altimeter.

One example of a conventional barometer utilizing the elastisity of a movable portion of an evacuated vacuum chamber is known from Japanese Patent Laid-Open No. 61-207941, in which an elastic distorsion or displacement of the vacuum chamber due to the pressure change is enlarged by a fulcrum mechanism to be indicated on a dial plate.

Also, in Japanese Patent Laid-Open No. 54-4181 and Japanese U. M. Laid-Open No. 61-36, a barometer of a structure is disclosed, in which the displacement of a vacuum chamber is converted into an electrical signal by using an electric pen which is fixed to the vacuum chamber and in sliding contact with the surface of an electric resistor to indicate electric resistance corresponding to the position of the pen.

The conventional barometric meter as above described comprises a mechanical moving part which moves in accordance with the elastic deformation of the movable portion of the vacuum chamber and an output part which outputs a barometric measurement such as a pointer on a dial panel or a slider, etc. of an electric resistor. The moving part and the output part are connected directly or through an interlocking mechanism.

In such structure, the play in the mechanically connected moving parts, the friction in the moving mechanism and the movable pointer and slider, the irregularity of the contact resistance of the slider, etc. are all causes of errors, so that a slight pressure change cannot be precisely measured and the device is not suitable for fixed-point barometric measurement on the ground.

Further, when the indicated value is to be read, it has been usual and necessary practice to hit the barometer with a finger to apply a small shock to it in order to prevent that any moving part is caught due to friction or play and that the pointer indicates an incorrect value.

SUMMARY OF THE INVENTION

Accordingly, a primary object of the present invention is to provide a barometric meter which contains no mechanical moving part.

Another object of the present invention is to provide a barometric meter which is very sensitive.

Still another object of the present invention is to provide a barometric meter which is very precise.

Another object of the present invention is to provide a barometric meter which is accurate and reliable.

A further object of the present invention is to provide a barometric meter which is inexpensive.

Another object of the present invention is to provide a barometric meter which is easily calibrated.

With the above objects in view, the barometric meter of the present invention comprises a vacuum chamber having a movable portion which displaces in proportion to atmospheric air pressure. An aperture plate having formed therein an aperture for allowing a light beam to pass therethrough is mounted to the movable portion of the vacuum chamber for movement therewith, and a light source stationary relative to the vacuum chamber is provided for illuminating the aperture plate. A photoelectric position detector disposed on the other side of the light source relative to the aperture plate and stationary to the vacuum chamber is provided for receiving the light beam which passes through the aperture in the aperture plate and for supplying an output indicative of the positional change of the light beam impinging on the photoelectric position detector. The output of the detector may be digitally displayed on a display as either air pressure or altitude.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENT

The present invention will now be described with reference to the accompanying drawings. The drawings illustrate an embodiment of the barometric meter of the present invention which comprises an optical position detector utilizing a semiconductive photoelectric conducting effect as a measuring portion for measuring the displacement of the vacuum chamber and a light-emitting diode as a light source.

Figure 1:
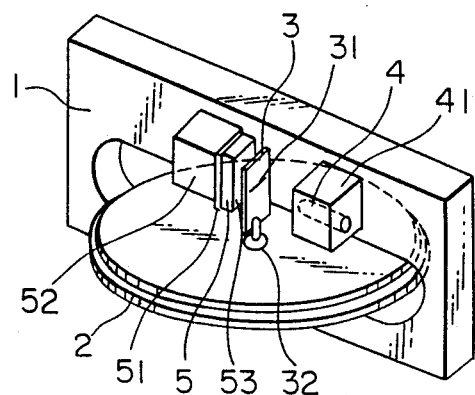
FIG. 1 is a perspective view of one embodiment of the barometric meter of the present invention.
Figure 2:
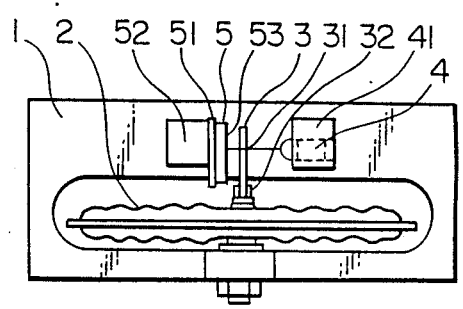
FIG. 2 is a front view of the barometric meter shown in FIG. 1.

FIGS. 1 and 2 are a perspective view and a front view of a barometric measuring portion of a barometer of the present invention, respectively, a disc-shaped vacuum chamber 2 is secured to a frame 1 at one of its major surfaces and has a movable portion at the center of the other major surface. Two vacuum chambers 2 may be used in a tandem relationship for a more sensitive measurement. The movable portion has an aperture plate 3 mounted thereon by a mounting fitting 32 attached to the vacuum chamber 2. The aperture plate 3 has formed therein an aperture 31 which is a slit extending perpendicularly to the direction of movement of the moving portion of the vacuum chamber in the illustrated embodiment. The aperture 31 may be circular or rectangular or other shapes, but the slit as illustrated is preferable.

The frame 1 has also mounted thereon, at the both sides of the slit plate 3, a light source 4 which is a light-emitting diode and an optical position detector 5 which is a semiconductor device using the above photo-electric conduction effect. Such semiconductor optical position detector may be one commercially available from Hamamatsu Photonics Kabushiki Kaisha under the trade name of "position sensitive detector" Type S1543 or Type S1771. The light source 4 is mounted to the frame 1 by a light source holder 41 and the optical position detector 5 is mounted to a detector mounting plate 51 which in turn is secured to the frame 1 by a detector holder 52. The optical position detector 5 has a light-receiving surface 53. As best seen from FIG. 4, the detector 5 has a pair of elongated parallel electrodes 55 and 56 at the upper and the lower edges of the light-receiving surface 53 and is reverse biased by an electric source 57. When a light beam impinges at a point 54 shown in FIG. 4 for example, an electric current flows from that region toward each of the electrodes 55 and 56. The magnitudes of the current flowing into the electrodes 55 and 56 depend on the light amount the light receiving region receives and the resistance of the current path which is proportional to its length. Thus, when the light amount is constant and the current from one of the electrodes 55 and 56 is known, the position of the light-impinging region 54 can be determined.

Figure 3:
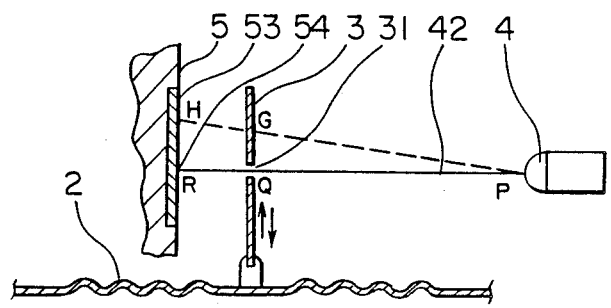
FIG. 3 is a view showing optical principle of the the barometric meter of the present invention shown in FIGS. 1 and 2.

The measurement of the displacement due to the elastic deformation of the vacuum chamber 2 is as illustrated in FIG. 3 illustrating the optical principle.

That is, the light source 4, the aperture in the form of the slit 31 of the aperture plate 3 mounted on the vacuum chamber 2, and the semiconductor optical position detector 5 are optically coupled as shown in the drawing. The displacement of the movable portion of the vacuum chamber 2 due to the elastic deformation of the vacuum chamber 2 and therefore the displacement of the slit 31 is measured as the amount of movement of the projection of the slit on the light-receiving surface 53 of the optical position detector 5 or the light impinging position 54.

In this case, in FIG. 3, when the slit 31 is moved from point Q to point G, the projection of the slit or the light impinging position 54 at which the light 42 from the light soruce 4 impinges after it passes through the slit 31 moves on the light-receiving surface 53 from point R to point H.

Since $\Delta PQG$ is similar to $\Delta PRH$, the displacement QG of the slit 31 is in precise proportion to the movement RH of the light impinging position 54 on the light-receiving surface.

Figure 4:
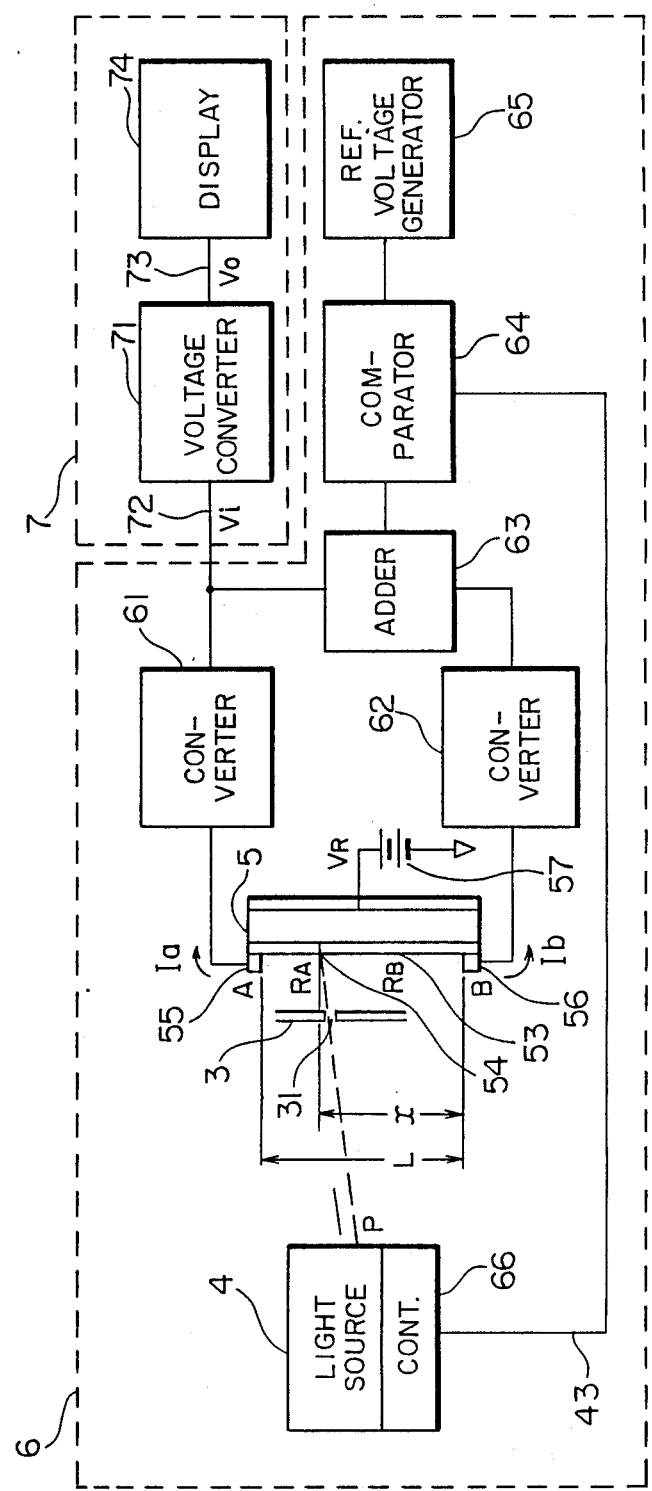
FIG. 4 is a block diagram showing the general construction of one embodiment of the barometric meter of the present invention.

The measurement of this movement RH can be easily understood from the block diagram of FIG. 4 showing the overall structure of the barometric meter of the present invention.

That is, in the automatic control circuit 6 shown in FIG. 4, it is assumed that the distance between the impinging light position 54 on the light receiving surface 53 of the optical position detector 5 and the electrode 56 (B) is x, the resistance therebetween is $R_B$, the resistance between the light impinging position 54 and the electrode 55 (A) is $R_A$, and that the distance between the electrode 55 and the electrode 56 is L. Then, the photo-electric current generated in proportion to the incoming light amount of the incoming light 42 at the light impinging position 54 is distributed in inverse proportion to the resistances $R_A$ and $R_B$ and flows out from the electrode 55 and the electrode 56 as the currents Ia and Ib, respectively. Therefore, the relationship between the current and the resistance is:

$$\frac{Ia}{R_B} = \frac{Ib}{R_A} = \frac{Ia + Ib}{R_A + R_B}$$

$$Ia = \frac{Ia + Ib}{R_A + R_B} \cdot R_B \quad (1)$$

Assume that the distance x and the resistance $R_B$ are proportional, $$Ia = \frac{Ia + Ib}{L} \cdot x \quad (2)$$

Therefore, the displacement of the vacuum chamber can be obtained by measuring Ia.

Further, Ia+Ib is the total amount of the photoelectric current generated at the light impinging position 54, so that the values Ia and x can be made perfectly proportional when the above toal value Ia+Ib can be made constant by adjusting the light incoming amount.

In order to make Ia+Ib constant, the barometric meter of the present invention comprises an automatic control circuit 6 as shown in FIG. 4. The automatic control circuit 6 comprises a pair of current-to-voltage converters 61 and 62 connected to the first and the second electrodes 55 and 56, respectively. The outputs of the current-to-voltage converters 61 and 62 are connected to an adder 63 where the voltage signals Vi1 and Vi2 corresponding to the currents Ia and Ib are added. The adder 63 is then connected to a comparator 64, where the added voltage signal from the adder 63 is compared with a reference voltage signal supplied from a reference signal generator 65. The output from the comparator 64 is connected through an adjusting signal line 43 to the light source controller 66 which adjusts the intensity of the light emitted from the light source 4 according to the output adjusting signal from the comparator 64. Therefore, the sum of the photo-electric currents Ia and Ib is always maintained equal to the constant reference value.

Therefore, Ia+Ib is constant substantially irrespective of the directionality of the light source, directional change of the incoming light 42 due to the slit position change and the change in the distance between the light source and the light impinging position.

The barometric meter of the present invention further comprises a display unit 7. The display unit 7 comprises a voltage converter 71 connected at its input 72 to the first current-to-voltage converter 61 and a digital display 74 connected to an output 73 of the voltage converter 71.

Thus, the amount Ia proportional to the displacement x of the light impinging position is taken out as a voltage Vi at the output of the current-voltage converter 61. This voltage is converted by the voltage converter 71 of the display 7 into a voltage Vo of a numerical value which is equal to the numerical value of the air pressure or altitude, and read as a voltage by a digital display 74 similar to a ordinary digital display voltmeter and displayed as the pressure or altitude.

Figure 5:
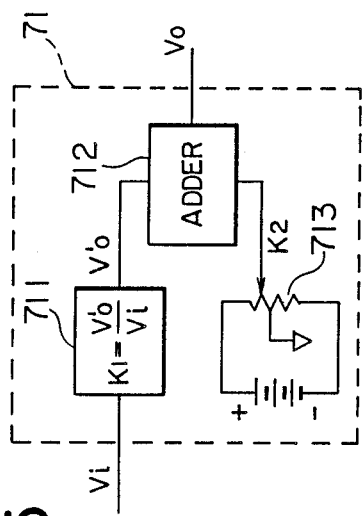
FIG. 5 is a block diagram showing one embodiment of the voltage converter used.

FIG. 5 illustates the detail of the voltage converter 71 shown in FIG. 4. The voltage converter 71 comprises an amplifier 711 connected to the output of the current-to-voltage converter 61 (FIG. 4). The output of the amplifier 711 is connected to one of inputs of an adder 712 of which the other inputs is connected to an adjustable voltage generator 713. The adder 712 adds the outputs from the amplifier 711 and the adjustable voltage generator 713 to supply an output Vo to the digital display 74 (FIG. 4). The voltage converter 71 has its internal circuit which maintains the relationship of the input Vi at the input side 72 and the output Vo at the output 73 to be:

$$Vo = K_1 Vi + K_2 \quad (3).$$

Where, $K_1$ and $K_2$ are constants, which satisfy the following equations assuming that the actual measured value of the voltage Vi generated in accordance with the air pressure or the altitude are Vi1 and Vi2 and that the corresponding outputs from the voltage converter 71 are Vo1 and Vo2:

$$K_1 = \frac{Vo2 - Vo1}{Vi2 - Vi1} \quad (4)$$

$$K_2 = Vo1 - K_1 Vi1 \quad (5)$$

Vo1 and Vo2 are voltages of the same numerical value of the corresponding air pressure or altitude.

For a barometric altimeter, equation (5) is an approximate equation for a range of altitude of from 0 m to 3000 m, which provides an error equal to or less than 5% with respect to the geopotential altitude.

One example of the actual numerical values for the barometer and the barometric altimeter for the displacement x of the vacuum chamber, the input Vi and the output Vo of the voltage converter 71 or the like against the air pressure or altitude are as shown in Table 1 and Table 2.

TABLE 1

| Air Pressure mbar | x mm | Vi mV | Vo mV |
|---|---|---|---|
| 1000 | 0.5 | 100 | 1000 |
| 500 | 1.5 | 300 | 500 |

TABLE 2

| Altitude m | x mm | Vi mV | Vo mV |
|---|---|---|---|
| 0 | 0.5 | 100 | 0 |
| 2500 | 1.0 | 200 | 2500 |

From these numerical values, the equations (3), (4) and (5) can be calculated for a barometer;

$$K_1 = -2.5, \quad K_2 = 1250 \quad (6)$$
and
$$Vo = -2.5 \cdot Vi + 1250$$

For an altimeter;

$$K_1 = 25, \quad K_2 = -1250 \quad (7)$$
and
$$Vo = 25 \cdot Vi - 1250$$

The voltage converter 71 achieves the conversions of the above equations (6) and (7).

The details of the internal structure of the above voltage converter 71 is shown in FIG. 5.

In FIG. 5, an amplifier 711 is for calculating the first term of the right side of the equation (3) or (6) and (7), and the constant $K_1$ designates its gain or loss.

A variable resistor 713 is a generator of the constant $K_2$ and calculating the right side of the equation (3) or (6) and (7) by an adder 712.

Figure 7:
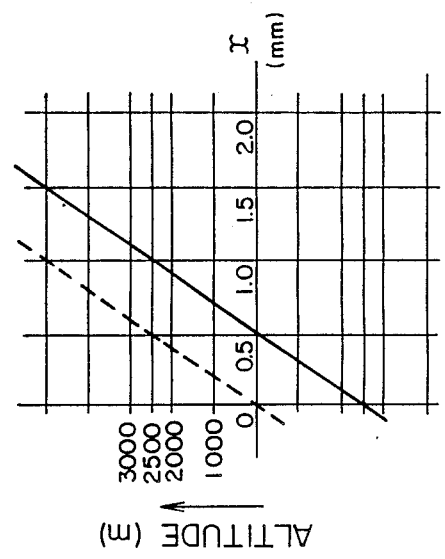
FIG. 7 is a graph showing one example of the operation of the barometric meter of Table 2.
Figure 6:
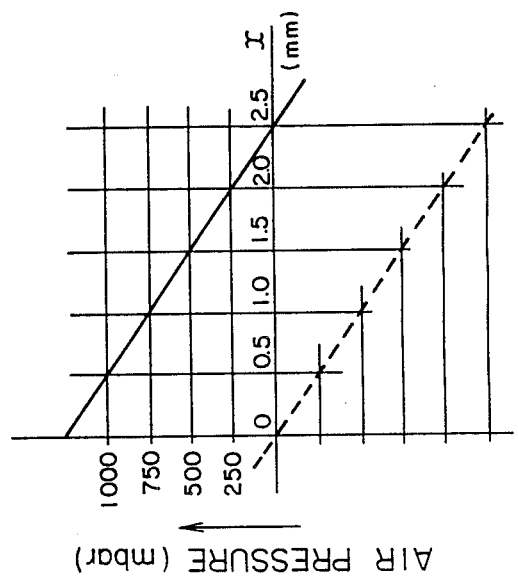
FIG. 6 is a graph showing one example of the operation of the barometer of Table 1.

The operation of the barometer of Table 1 and the barometric altimeter of Table 2, i.e., the graphs expressing the equations (6) and (7) are shown in FIGS. 6 and 7.

In both of the figures, the axis of abscisa represents the displacement x of the vacuum chamber and the axis of ordinate represents respective values corresponding to the air pressure and the barometric altitude, solid lines in the both figures representing the equations (6) and (7) against the variation of x, dotted lines representing the first terms of the right side of the respective equations, and the distances (the differences along the axis of ordinate) between the solid and dotted lines representing the second term of the right side of the equations.

The barometric meter such as the barometer or the barometric altimeter of the present invention as above constructed comprises a light source 4, a slit plate 3 with a slit 31 fixedly mounted on a vacuum chamber 2 and an optical position detector 5 as shown in a diagram showing the optical principle of FIG. 3, with a mechanical connecting mechanism as in the conventional barometer eliminated.

The light emitted from the light source 4 is irradiated on the optical position detector 5 through the slit 31 of the slit plate 3, and the displacement of the vacuum chamber 2 to which the slit plate 3 is mounted is grasped as the positional change of the light incoming through the slit 31 onto the optical position detector 5 and this displacement is measured and displayed.

Therefore, there is no movable parts except that the slit 31 moves as the vacuum chamber 2 displaces, so that there is no play which occurs in the movable parts, and since the mechanism for the measurement is an optical mechanism which does not contact the vacuum chamber, no mechanical load is applied to the vacuum chamber.

Also, there is no part which generates friction during movement, and the slit plate 3 is not unnecessary load for the vacuum chamber when its atitude changes since the slit plate 3 is light-weight, and since the displacement of the incoming light 54 or the projection of the slit 31 on the light-receiving surface 53 of the optical position detector 5 is measured, there is no room for the errors due to instability of the contact resistance of the slider or the like in the sliding resistor.

A barometric meter having a very high precision than that of the conventional design can be manufactured by utilizing an optical position detector of a higher sensitivity and superior resolution with respect to the displacement of the vacuum chamber.

Further, by utilizing a semiconductor device having the photo-conduction effect as the optical position detector, the photo-electric current generated at a position at which the incoming light impinges on the light-receiving surface is maintained constant by providing an automatic control circuit for adjusting the intensity of the light source, and by providing a circuit which converts the output from the optical position detector into a predetermined numerical value, such as a numerical value indicative of the air pressure for the barometer or a numerical value indicative of the altitude for the altimeter, the device can be used as a directly readable digital instument.

It is to be noted that the barometric meter of the present invention can be easily modified between a barometer in which the air pressure is measured and converted into a numerical value indicative of the air pressure and a barometric altimeter in which the measured air pressure is converted into barometric altitude.

As has been described in detail, the present invention utilizes an optical system in the portion for reading out the displacement of the vacuum chamber, so that the present invention exhibits the following advantages as a barometric meter including a barometer or a barometric altimeter.

(1) The vacuum chamber has mounted thereon a simple aperture plate with a slit therein for causing the incident light from the light source to become a beam of light which impinges upon the optical position detector so that the position of the light beam may be detected by the photoelectric detector, there is no play which may be generated in a mechanically connecting mechanism.

(2) Since there is no mechanical contact between the optical measuring mechanism and the vacuum chamber, no load is applied to the vacuum chamber. Therefore the vacuum chamber can freely expand and contract in proportion to the air pressure alone, without affecting other external force.

(3) There is generated no mechanical friction.

(4) The slit plate mounted to the vacuum chamber can be made very light, so that the displacement of the vacuum chamber due to the change in air pressure is not affected by the weight of the slit plate.

(5) As compared to the conventional barometer utilizing a slider resistor, there is no cause for the instability of the contact resistance of the slider.

(6) There is no movable part except for the slit, so that the structure is strong against vibration.

(7) Because of the effects set forth in items (1), (2), (3) and (6) above, the barometer accurately responds to very small changes in pressure without any delay, so that the present invention can be applied not only to an ordinary barometer but also to fixed point observation.

(8) Structure is simple with no movable part and assembly is easy, so that inexpensive manufacture is possible.

(9) When the photo-electric current generated at the light impinging position on the light receiving surface is maintained constant by the automatic control circuit, an electric output precisely proportional to the displacement of the vacuum chamber can be obtained.

(10) Further, when the value of the electric output set forth in the item (9) above, is converted by the conversion circuit calculating the above equation (3), it is very easy to make a digitalized barometer or barometric altimeter.

As apparent from the above-discussed advantageous effects, the present invention has an overwhelming superior usefulness as compared to the conventional art.

What is claimed is:

1. A barometric meter comprising:
a vacuum chamber having a movable portion which displaces in proportion to atmospheric air pressure;
a light source which is relatively movable with respect to said movable portion of said vacuum chamber;
an aperture plate mounted to said movable portion of said vacuum chamber for movement therewith, said aperture plate having an aperture formed therein for allowing a beam of light emitted from said light source to pass therethrough;
a photo-electric position detector, disposed on the other side of said light source relative to said aperture plate and relatively movable with respect to said movable portion of said vacuum chamber, for receiving the light beam which passes through said aperture in said aperture plate to generate a photo-electric signal from a light-receiving region thereof at which said light beam impinges on said photo-electric position detector;
display means connected to said photo-electric position detector for displaying barometric pressure as a function of said photo-electric signal; said display means comprising a voltage converter connected to said photo-electric position detector for converting an input signal Vi supplied thereto from said photo-electric position detector into an output voltage Vo according to $$Vo = K_1 \times Vi + K_2$$

where, $K_1$ and $K_2$ are constants; said voltage converter comprising an amplifier connected to said photo-electric position detector for amplifying an output signal from said position detector by a factor of $K_1$, an adjustable voltage generator for generating a constant voltage $K_2$, and an adder connected at its inputs to said amplifier and said voltage generator for supplying an output voltage which is a sum of said output signal from said position detector multiplied by $K_1$ and said constant voltage $K_2$.

2. A barometric meter comprising:
a vacuum chamber having a movable portion which displaces in proportion to atmospheric air pressure;
a light source which is relatively movable with respect to said movable portion of said vacuum chamber;
an aperture plate mounted to said movable portion of said vacuum chamber for movement therewith, said aperture plate having an aperture formed therein for allowing a beam of light emitted from said light source to pass therethrough;
a photo-electric position detector, disposed on the other side of said light source relative to said aperture plate and relatively movable with respect to said movable portion of said vacuum chamber, for receiving the light beam which passes through said aperture in said aperture plate to generate a photo-electric signal from a light-receiving region thereof at which said light beam impinges on said photo-electric position detector;
display means connected to said photo-electric position detector for displaying barometric pressure as a function of said photo-electric signal; and an automatic control circuit comprising a pair of electrodes mounted spaced apart from each other on said photo-electric position detector for collecting photo-electric current generated at said light-receiving region, a pair of current-to-voltage converters each connected to said pair of electrodes for converting photo-electric current into voltage output signals, an adder connected at its inputs to said current-to-voltage converters for making a sum of said voltage output signals, a reference signal generator for supplying a constant reference voltage signal, a comparator connected between said adder and said reference signal generator to provide a difference signal between the reference voltage and said sum of voltage output signals from the adder and a brightness control circuit for adjusting the brightness of said light source on the basis of said difference signal to maintain said sum of said voltage output signals constant.

* * * * *